United States Patent [19]

Senterfitt et al.

[11] Patent Number: 4,966,229

[45] Date of Patent: Oct. 30, 1990

[54] LEADING EDGE HEAT PIPE ARRANGEMENT

[75] Inventors: Donald R. Senterfitt, Jupiter; James R. Mullaly, Palm Beach Gardens; Larry D. Hamner, Palm Beach Gardens; Abdus S. Khan, Palm Beach Gardens, all of Fla.; John G. Smeggil, Simsbury, Conn.

[73] Assignee: United Technologies Corporation, Hartford, Conn.

[21] Appl. No.: 457,064

[22] Filed: Dec. 26, 1989

[51] Int. Cl.$^5$ .................. F28D 15/02; B64C 1/38; B64D 37/34
[52] U.S. Cl. ............................. 165/41; 62/7; 165/169; 244/117 A; 244/158 A
[58] Field of Search .............. 165/41, 169; 62/7; 244/117 A, 158 R, 158 A

[56] References Cited

U.S. PATENT DOCUMENTS

| | | | |
|---|---|---|---|
| 2,943,828 | 7/1960 | Van Driest | 62/7 |
| 3,369,782 | 2/1968 | Billig et al. | 244/117 A |
| 3,517,730 | 6/1970 | Wyatt | 165/32 |
| 3,682,100 | 8/1972 | Lindberg, Jr. | 244/163 |
| 3,929,305 | 12/1975 | Sabol | 244/117 A |
| 4,671,348 | 6/1987 | Bauer | 165/41 |

Primary Examiner—Albert W. Davis, Jr.
Attorney, Agent, or Firm—Edward L. Kochey, Jr.

[57] ABSTRACT

Heat pipe (10) includes an acute angle leading wedge shape form (38) with a radiused leading edge (26). Engine fuel supply (65) cools the trailing wedge shape form (40). The intense heat flux at the leading edge is cleanly dissipated and spread over substantial heat pipe cooling surface (64, 66). A coating (36) on the external surface of the leading edge wedge shape form is formed of a layer of iridium and a layer of oxide.

11 Claims, 2 Drawing Sheets

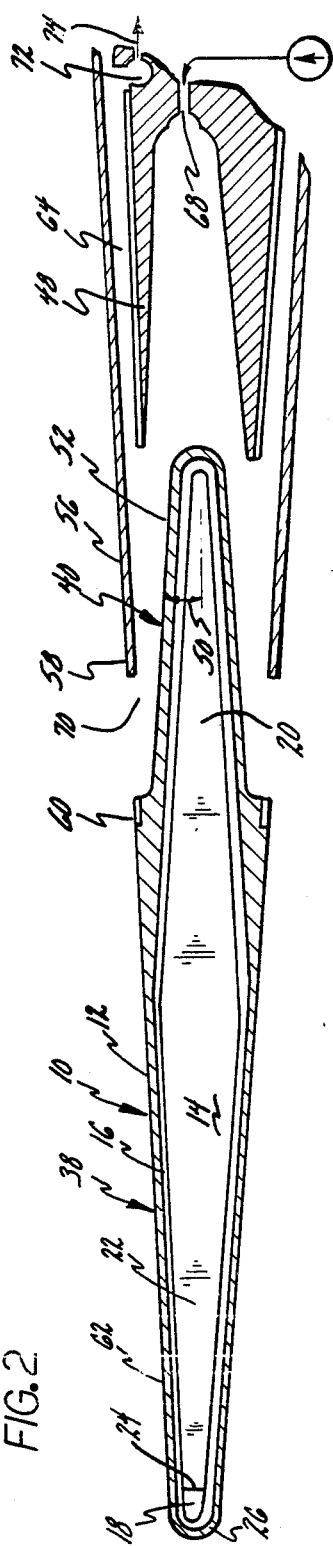
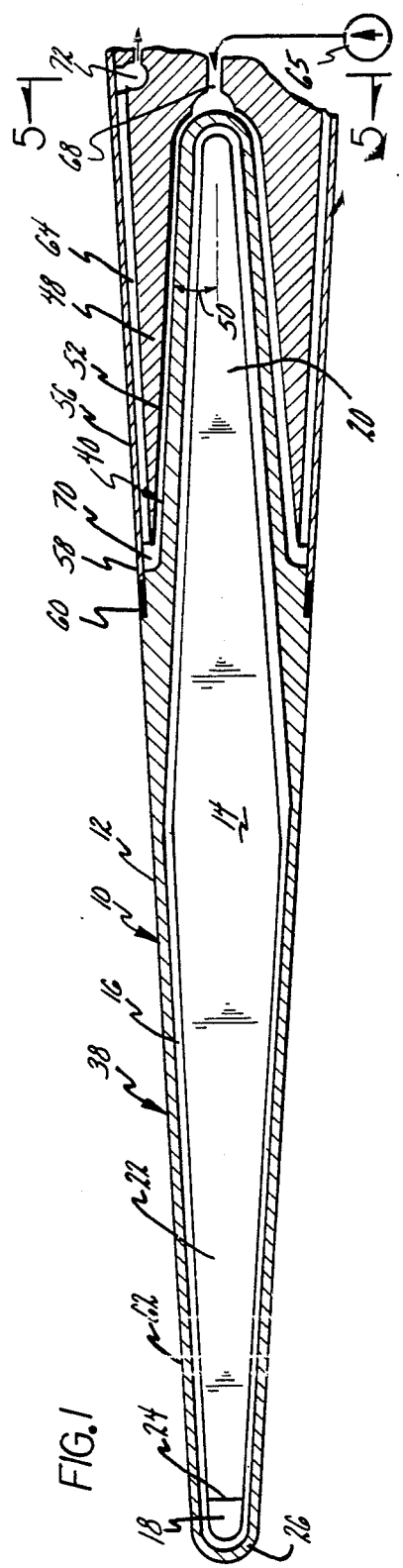
FIG. 1
FIG. 2

LEADING EDGE HEAT PIPE ARRANGEMENT

TECHNICAL FIELD

The invention relates to the leading edge of a hypersonic engine, and in particular to a heat pipe arrangement therefor.

BACKGROUND

Leading edges of structures for hypersonic flight are subject to high heat loads. They either have to be made of ablative material (sacrificial), or they need to be cooled. Most previous applications were ablative, (i.e. rocket noses, mercury, apollo), or were not conducive to small leading edge pieces as required in some new applications. Space shuttle tiles are not suitable for small nosepieces because they could not stand the heat flux generated on a small radius nose. No known material can withstand these heat fluxes if uncooled.

With a reusable air breathing vehicle there is a need for a leading edge that does not have to be replaced each flight. With air breathing engines mounted externally on these vehicles the leading edge heat flow problem is compounded. The interference shock wave caused by interference between the shock wave from the nose of the aircraft and from the leading edge of the engine inlet cowl creates extremely high leading edge heating. This creates higher heat fluxes than previously experienced. Also the leading edge of this type requires a small radius nosepiece for aerodynamic reasons.

The interference shock wave causes an extreme heating in an area over a width of about 10/1000 of an inch. Beyond this area there is a sharp drop off in heat loading to a high, but less extreme level. The localized heat flux can reach 100,000 btu's/ft$^2$ sec. The ability to locally remove this heat is critical to successful operation of any leading edge protection arrangement. Not only must the heat be removed rapidly from the interior surface of the leading edge, but the material thickness must be sufficiently minimized because of the temperature rise across the metal thickness at such high heat rates.

It is also important to effectively remove heat from the heat pipe in order to keep the operating temperature level within the heat pipe to an appropriate level.

SUMMARY OF THE INVENTION

A diamond shaped heat pipe containing lithium has a containment material thickness. The heat pipe has an acute angle leading wedge shape form which has sides at an included angle of 6 degrees and a radius joining the two sides of about 10 times the thickness of the containment material at this location. The containment material at the nose location may be less than in the remainder of the heat pipe because of the reduced bending stresses in a cylindrical component as compared to a flat component.

The heat pipe has an acute angle trailing wedge shape with sides also at an included angle of about 6 degrees. Outwardly extending heat exchange surface is located along the containment material of the trailing wedge shape for cooling of the heat pipe. Fuel supply for the engine passes in heat exchange relationship with this heat exchange surface. The fuel and pump are already required, and are not additional weight. The heat the fuel picks up from cooling actually enhances engine performance because of higher entry fuel temperatures.

BRIEF DESCRIPTION OF THE DRAWINGS

FIG. 1 is a sectional view of the heat pipe as installed;
FIG. 2 is an exploded view of the heat pipe as installed.

DESCRIPTION OF THE PREFERRED EMBODIMENT

Figure 3:
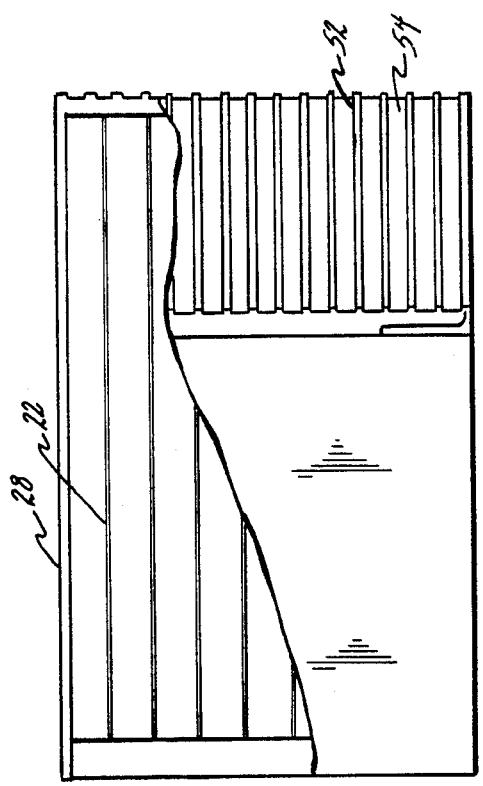
FIG. 3 is a top partial section of the heat pipe.

Referring now to FIGS. 1 and 2, heat pipe 10 is of a substantially diamond shape and has a containment material 12 which contains a supply of lithium within the interior 14 of the heat pipe. This containment material is preferably an alloy of tungsten and rhenium which can withstand over 4000 F. The tungsten provides good thermal conductivity while the rhenium gives the part ductility. The alloy is optimized between conductivity and ductility and is compatible with lithium.

Internal capillary wicking 16 is provided within the heat pipe, in accordance with conventional heat pipe practice, to conduct lithium toward the leading edge 18 of the heat pipe. The lithium is vaporized at the nose by the heat being absorbed. The vapor is then condensed in the trailing section 20 which is cooled by the fuel. The liquid is then conveyed by the capillary action of the wick to the leading edge. In essence this device absorbs heat in large part from a small area of the nose and disperses it over the large area at the trailing edge.

As best seen in FIG. 3, a plurality of reinforcing ribs 22 extend substantially the full length of the heat pipe as reinforcing means for the containment surface. The front edge 24 of each plate is cut short which permits liquid and vapor equalization among the adjacent chambers.

Periodically a full length end plate 28 is located to provide isolation of the various lithium chambers.

Figure 4:
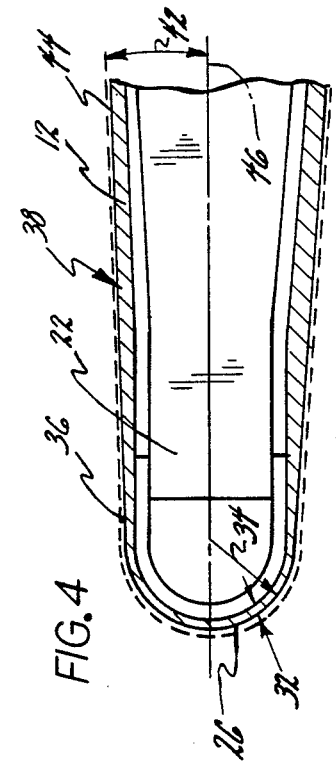
FIG. 4 is a detail of the nose of the leading edge.

FIG. 4 is a detail of the leading edge 26 of the heat pipe where the normal thickness 30 of containment 12 is 0.02 inches. This is reduced to a thickness 32 of 0.01 at the cylindrical portion of the leading edge 26 of the heat pipe. The radius 34 is 0.10 inches. The ratio of the radius to thickness is 10, and should preferably be between 2 and 20. It is important for aerodynamic and performance reasons that the overall width and therefore radius of this leading edge be as small as possible, preferably below 0.250 inches. The use of this radius avoids pointed projections at the leading edge which would locally increase the metal thickness, and therefore increase the maximum metal temperature. In order to successfully cool the local high temperature area right at the apex, it is necessary that the liquid be free to flow easily to this area. If the radius were too small, the local boiling would drive the liquid away precluding a uniform cooling flow. It could also interfere with the free flow of vapor from the heated area.

An exterior coating shown in phantom as coating 36 may be added to a portion or all of the exterior surface. The purpose of this coating is primarily to provide high temperature oxidation resistance and may be formed of a layer of iridium in turn coated with a high melting point oxide or material that forms a high melting point oxide. The iridium may be doped or alloyed to achieve required mechanical properties and diffusional stability. The iridium may be 0.001 to 0.005 inches thick. The oxide serves to pin the volatile oxides that will form on the iridium and also to reduce heating due to the catalytic recombination of disassociated gas species. This oxide may be aluminum oxide, beryllium oxide or stabilized hafnia. These oxides may be formed from carbide, boride or nitride precursors.

With aluminum oxide the nose of the heat pipe could withstand temperatures to 3,400 F., while with beryllium oxide it is anticipated that it could withstand temperatures up to 4,500 F. in a high velocity air environment. This coating may be very thin on the order of 0.0001 to 0.0002 inch.

The diamond shaped heat pipe 10 is formed of an acute angle leading wedge shape form 38 and an acute angle trailing wedge shape form 40. The angle 42 (FIG. 4) between side 44 of the leading wedge shape form and the centerline 46 is 3 degrees which establishes an included angle between the sides of 6 degrees.

The trailing edge wedge shape form 40 of heat pipe 10 is secured to support structure 48 by diffusion bonding or brazing. This trailing wedge shape is also at an angle 50 of three degrees with respect to the centerline for an included angle of 6 degrees. The use of an acute angle increases the support of the heat pipe by support structure 48 and also provides a more substantial heat exchange surface.

A plurality of ribs forming extending heat exchange surface 52 are located on the containment material of this wedge forming fluid flow paths 54 therebetween. The ribs 52 are in contact with the support structure so that coolant flow described later passes through these openings 54.

Thermal skin 56 is brazed to support structure 48 along the top of ribs 64. It is attached to the heat pipe at location 58, by sputter deposition of rhenium into space 60. The outside surface is machined with thermal skin 56 comprising a linear extension of side 62 of the leading wedge shape form.

The openings between the ribs 64 provide flowpath for coolant.

A fuel pump 65 establishes a flow of fuel passing to the engine which is directed into inlet 68 upstream of the heat pipe. This flow splits with a portion passing along the upper surface of the heat pipe and a portion passing along the lower surface. Flow passes through openings 54 between ribs 52 cooling the surface of the heat pipe. The flow reverses in chamber 70 and passes through space 66 between ribs 64. This provides a return flow to chamber 72 from which the flow 74 continues to the engine. Thus, a forced flow cooling is effected over the extending heating surface which has a substantial length. This provides substantial cooling for the heat pipe.

Figure 5:
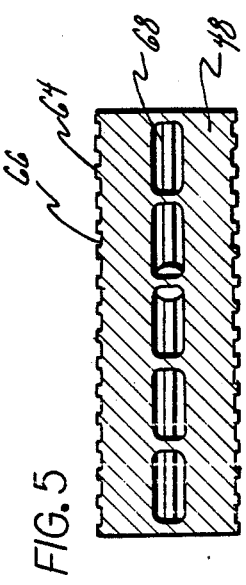
FIG. 5 is a section through the coolant fuel path.

As best seen in FIG. 5, a plurality of openings 68 are located in parallel flow relationship across the heat pipe to facilitate the establishment of uniform flow across the width of the heat pipe.

We claim:

1. In hypersonic engine driven aircraft;
a leading edge cooling apparatus comprising:
an acute angle diamond shaped heat pipe having a containment material thickness, and containing a vaporizable medium;
said heat pipe having an acute angle leading wedge shape form having sides at an included angle between 4 degrees and 10 degrees, and a radius joining the two sides between 2 and 20 times the thickness of the containment material at the radius location;
said heat pipe having an acute angle trailing wedge shape having sides at an included angle between 4 degrees and 10 degrees;
outwardly extending heat exchanger surface longitudinally extending along the containment material of said trailing wedge shape;
a fuel supply means for the engine; and
confinement means for passing fuel from said fuel supply means in heat exchange relationship with said heat exchange surface.

2. An apparatus as in claim 1:
said vaporizable medium being lithium:

3. An apparatus as in claim 1:
said leading edge having a radius less than 0.250 inch.

4. An apparatus as in claim 1:
the included angle of the sides of said leading wedge shape being between 5 degrees and 7 degrees.

5. An apparatus as in claim 1:
a thermal skin arranged as a continuation of the surface of said leading wedge shape form; and
said confinement means establishing a coolant flowpath from the apex of said trailing wedge shape along said heat exchange surface, and thence adjacent said thermal skin.

6. An apparatus as in claim 3:
the included angle of the sides of said leading wedge shape being between 5 degrees and 7 degrees.

7. An apparatus as in claim 6:
a thermal skin arranged as a continuation of the surface of said leading wedge shape form; and
said confinement means establishing a coolant flowpath from the apex of said trailing wedge shape along said heat exchange surface, and thence adjacent said thermal skin.

8. An apparatus as in claim 7:
said vaporizable medium being lithium.

9. An apparatus as in claim 7:
a coating of iridium on the outer surface of said leading wedge shape form; and
a coating of oxide on said coating or iridium.

10. An apparatus as in claim 9:
said coating or iridium being between 0.001 and 0.005 inches thick.

11. An apparatus as in claim 10:
said coating of oxide being between 0.0001 and 0.0005 inches thick.

* * * * *

UNITED STATES PATENT AND TRADEMARK OFFICE
CERTIFICATE OF CORRECTION

PATENT NO. : 4,966,229

DATED : October 30, 1990

INVENTOR(S) : Donald R. Senterfitt et al

It is certified that error appears in the above-identified patent and that said Letters Patent is hereby corrected as shown below:

Column 1, After the Title, Line 5 insert --The Government has rights in this invention pursuant to a contract awarded by the Department of the Air Force.--

Signed and Sealed this

Tenth Day of March, 1992

Attest:

HARRY F. MANBECK, JR.

*Attesting Officer*  *Commissioner of Patents and Trademarks*